Figure 1:
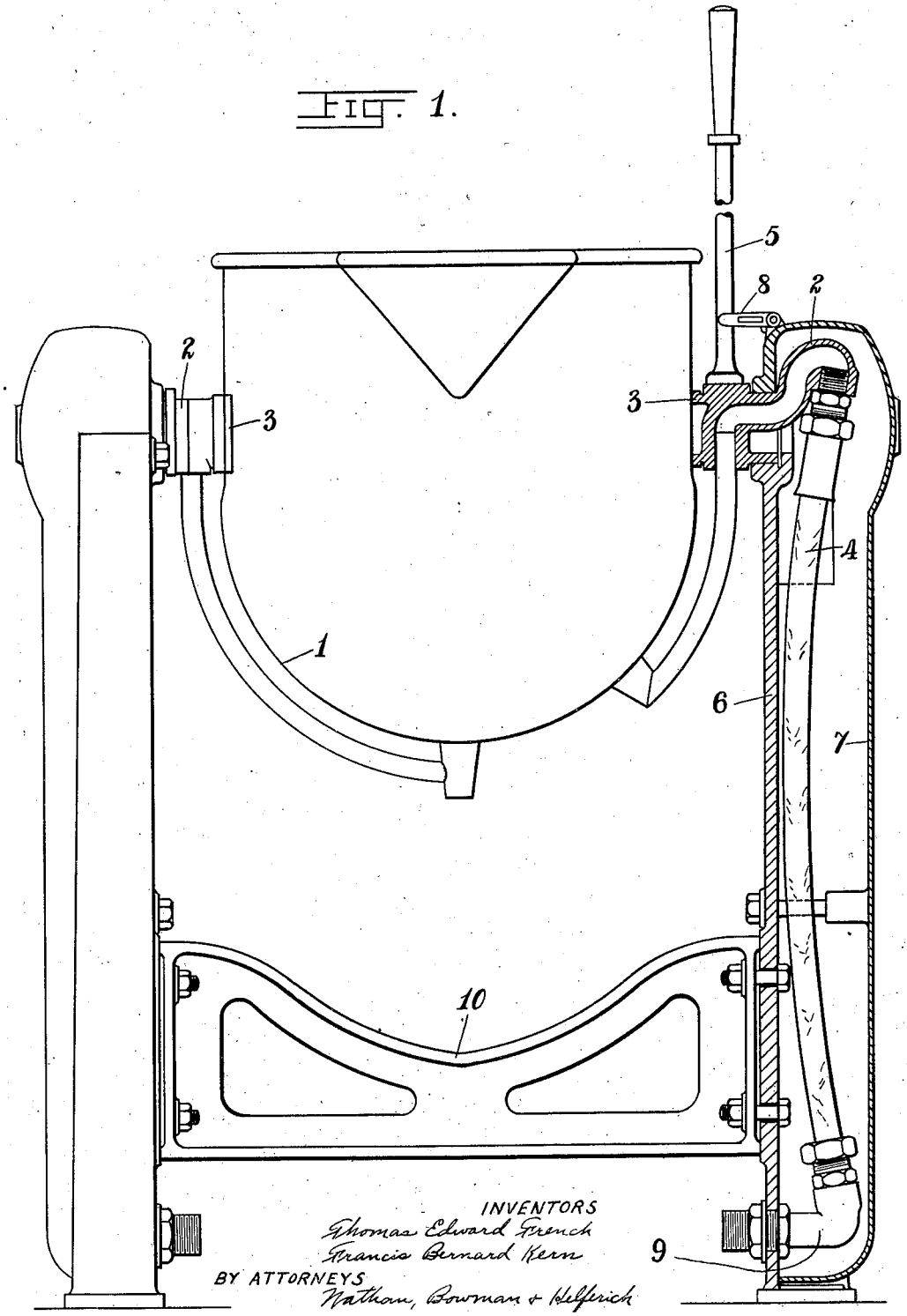

March 12, 1935.  T. E. FRENCH ET AL  1,993,779
TILTING PAN AND THE LIKE
Filed May 3, 1932   3 Sheets-Sheet 1

INVENTORS
Thomas Edward French
Francis Bernard Kern
BY ATTORNEYS
Nathan, Bowman & Helferich March 12, 1935.   T. E. FRENCH ET AL   1,993,779
TILTING PAN AND THE LIKE
Filed May 3, 1932    3 Sheets-Sheet 2

INVENTORS
Thomas Edward French
Francis Bernard Kern
BY ATTORNEYS
Nathan, Bowman & Helfrich March 12, 1935.  T. E. FRENCH ET AL  1,993,779
TILTING PAN AND THE LIKE
Filed May 3, 1932   3 Sheets-Sheet 3

INVENTORS
Thomas Edward French
Francis Bernard Kern
BY ATTORNEYS
Nathan, Bowman & Helfrich Patented Mar. 12, 1935

1,993,779

UNITED STATES PATENT OFFICE 1,993,779

TILTING PAN AND THE LIKE

Thomas Edward French and Francis Bernard Kern, London, England

Application May 3, 1932, Serial No. 608,930
In Great Britain May 19, 1931

2 Claims. (Cl. 126—349)

This invention relates to improvements in tilting pans, such as steam boiling pans and the like whether jacketed or non-jacketed.

The present invention is directed to the trunnion or like bearing of articles of the above kind, wherein it is desired to transfer a fluid from the stationary support to a known coil or jacket of the pan.

In the particular example hereinafter described the invention is applied to a jacketed steam tilting pan, although it is to be understood the invention is not limited thereto.

It has been found in practice that with tilting pans especially when fabricated from wrought metal, the aligning of the usual form of trunnion, is a difficult and expensive operation, and unless done in an efficient manner, tilting of the moving portion of the pan is a difficult operation. Moreover it is also difficult to keep the trunnions fluid tight, and leakage of the fluid continually takes place resulting in loss.

With the existing or known form of trunnion the manufacture of such articles calls for expert workmanship executed by skilled labour, as in the case of a steam jacketed tilting pan the bearings must be well finished so as to avoid binding and leakage troubles.

The object of the present invention is to provide an improved construction of bearing or mounting for steam tilting pans or vessels, in which the costly operation of lining up the trunnions is obviated, and the packed gland is eliminated altogether, thus giving economy of manufacture and freedom from fluid leakage.

According to the present invention a hollow trunnion connected to the coil or jacket of the pan or the like has a foreshortened bearing surface with respect to the usual hollow trunnion used and a packed gland is eliminated that is to say the bearing is glandless. To the outer end of the trunnion there is connected a fluid inlet or outlet component in the form of a flexible hose or the equivalent, the parts being so related and arranged that the pan can be tilted about a turning axis, the flexible hose accommodating itself to the tilting movement.

The accompanying drawings illustrate an arrangement of steam jacketed tilting pan according to the present invention.

In the drawings:—

Figure 2:
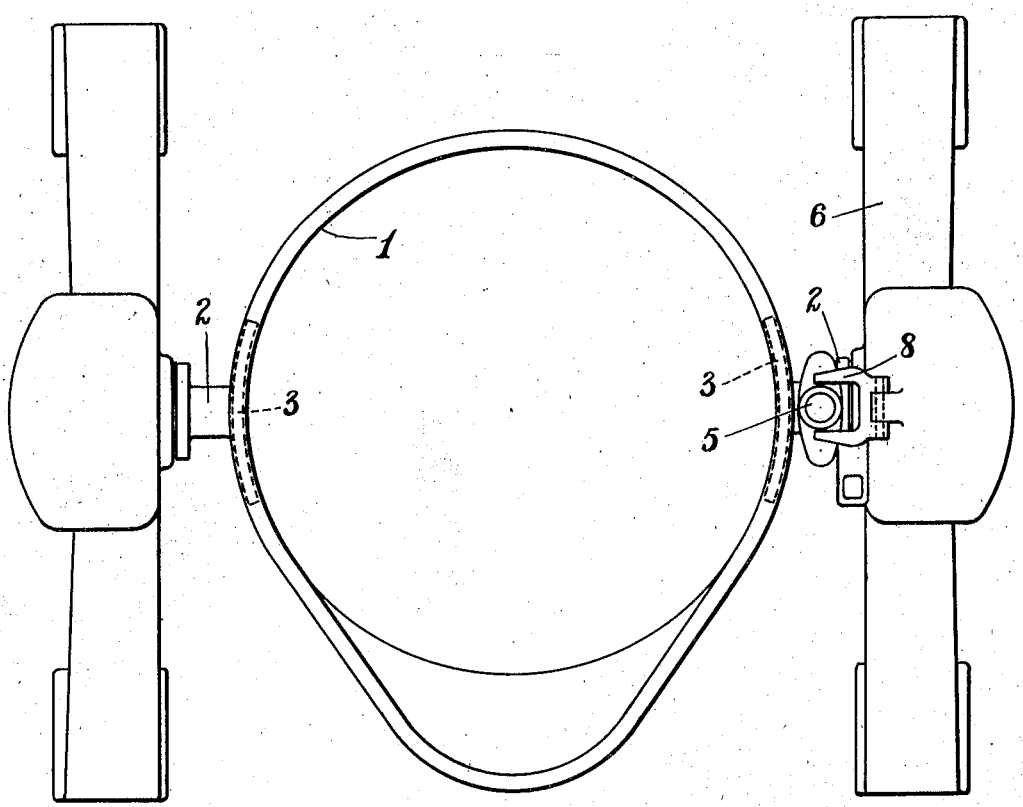
Figure 3:
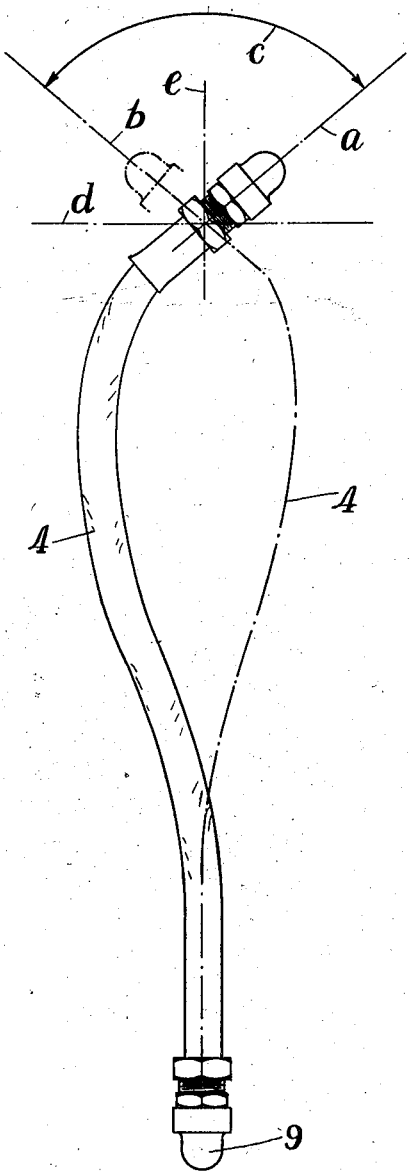

Fig. 1 is a sectional elevation, Fig. 2 a plan view with the well known heating coil removed, and Fig. 3 a part end view showing a flexible hose connexion.

To each side of a tilting pan 1 is attached a trunnion 2. One way of attaching the trunnions is to rivet the palms 3 thereof to the pan 1. One or both of these trunnions is or are formed as follows:—

The trunnion 2 is hollow and is of a shape comparable to a return bend, with the palms 3 thereof bent to suit the pan and riveted thereon. The other end of the trunnion is adapted to receive the union of a flexible hose 4, for example, by way of a screwed connexion. The hose connexion has a bell mouth end, and is screwed tightly into the trunnion and jointed with a suitable jointing composition.

As shown in Fig. 3, the flexible hose is so arranged as to accommodate itself to the swinging or tilting of the pan on the trunnions.

With such a form of trunnion and a flexible hose component, machining operations on the trunnion are considerably reduced, and/or can be avoided altogether.

The trunnion has an arm 5 thereon for tilting the pan.

The trunnions are mounted in glandless bearings provided in a frame or standard which may comprise a frame 6 and a head or front part 7 forming a housing for the flexible hose. In another construction the frame or standard has a detachable cap or head. The front of the frame or standard may have a detachable panel so that ready access to the hose is provided.

A pivoted fork 8 serves as a lock or catch for the tilting arm 5.

The end of the flexible hose remote from the trunnion has a connexion, for example, an elbow union 9, for connection to the fluid supply or exhaust. The hose connexion is screwed tightly into the elbow and jointed with a suitable jointing composition. 10 is a stretcher mounted between the two frames or standards.

The fluid-way in the trunnion is adapted to be connected to a tube or tubes or the equivalent leading therefrom, to the known heat exchange device such as the space between the jacket and the pan, or as in Fig. 1 to a known coil located within the pan itself.

To allow of a free movement of the hose and to avoid jamming thereof when the pan is moved, the point of attachment of the hose to the trunnion is substantially in alignment with the axis of the rotation of the said trunnion. Moreover the axes of the connecting ends of the hose are angularly disposed to one another so that the hose is bowed. As shown in Fig. 3 the line $a$ is the centre line of the hose when the pan is in an upright position, $b$ the centre line when the pan is in the tilted position. The arc $c$ indicates the movement of the pan, and $d$ and $e$ the normal horizontal and vertical lines respectively.

By the present invention considerable economies can be effected in manufacture and leakage of the fluid around the trunnion wall obviated.

With a tilting pan according to the construction above described, the length of an ordinary trunnion and gland, if used, would not be less than six inches, and must of necessity be carefully machined and fitted, whereas the length of the trunnion, according to the present invention, will not exceed one inch. Moreover the trunnion need not be machined but merely cleaned up with a file.

We claim:

1. A mounting for steam-heated tilting pans in which the fluid passes through hollow trunnions to a heat exchange device, comprising a short glandless bearing, a hollow trunnion connected to the pan having a short journal mounted in said bearing, said trunnion having an extension of a shape comparable to a return bend, a flexible hose attached to said extension, and a pipe connecting said hollow trunnion to said heat exchange device.

2. A mounting for steam-heated tilting pans in which the fluid passes through hollow trunnions to a heat exchange device comprising a frame, a short glandless bearing therein, a hollow trunnion connected to the pan and having a short journal mounted in said bearing, said trunnion having an extension of a shape comparable to a return bend, a flexible hose attached to said extension, the point of attachment being substantially at the axis of rotation of the trunnion, and a housing on said frame for the flexible hose.

T. E. FRENCH.
F. B. KERN.